United States Patent
Cheung

(10) Patent No.: US 8,533,245 B1
(45) Date of Patent: Sep. 10, 2013

(54) MULTIPLIERS WITH A REDUCED NUMBER OF MEMORY BLOCKS

(75) Inventor: Colman C. Cheung, San Diego, CA (US)

(73) Assignee: Altera Corporation, San Jose, CA (US)

( * ) Notice: Subject to any disclaimer, the term of this patent is extended or adjusted under 35 U.S.C. 154(b) by 819 days.

(21) Appl. No.: 12/716,280

(22) Filed: Mar. 3, 2010

(51) Int. Cl.
*G06F 7/00* (2006.01)
*G06F 15/00* (2006.01)

(52) U.S. Cl.
USPC ............ 708/205; 708/201; 708/209; 708/490

(58) Field of Classification Search
None
See application file for complete search history.

(56) References Cited

U.S. PATENT DOCUMENTS

2008/0205717 A1* 8/2008 Reeves et al. ................. 382/128
2009/0322749 A1* 12/2009 Kassab et al. ................. 345/424

* cited by examiner

*Primary Examiner* — Scott Sun
(74) *Attorney, Agent, or Firm* — Womble Carlyle Sandridge & Rice, LLP

(57) ABSTRACT

Techniques for implementing multipliers using memory blocks in an integrated circuit (IC) are provided. The disclosed techniques may reduce the number of memory blocks required to implement various multiplication operations. A plurality of generated products is normalized. The normalized products are scaled to generate a plurality of scaled products. Scaled products with the least root mean square (RMS) error are identified. The scaled products with the least RMS error are then stored in a plurality of memory blocks in an IC. The scaled products may have a reduced number of bits compared to the plurality of generated products that have not been normalized and scaled.

21 Claims, 6 Drawing Sheets

MULTIPLIERS WITH A REDUCED NUMBER OF MEMORY BLOCKS

BACKGROUND

Filter applications used in digital signal processing (DSP) systems require complex arithmetic capabilities. Efficient complex multiplications are increasingly needed in order to implement some of these filters. High-end DSP functions and finite impulse response (FIR) filters, for instance, require efficient multipliers. Integrated circuits (ICs) that are used to implement these DSP systems need to have cost-effective multipliers that can achieve all the required functions.

Generally, multipliers can be implemented either with embedded DSP blocks or dedicated blocks with customized multipliers, memory blocks, or logic elements in an IC. In most instances, memory based multipliers, also known as soft multipliers, are a flexible alternative to using DSP blocks. Generally speaking, soft multipliers utilize partial look-up tables (LUTs) to implement multiplication operations. Each address of the LUT can be used to represent a unique sum of a multiplication result. For instance, a memory block with a 5-bit wide input will be able to store 32 different combinations. All 32 possible combinations of a multiplicand summation are calculated and stored in the memory block as a LUT. Different configurations of multipliers can be generated by using different coefficient LUTs.

However, generally, the data width of memory blocks is limited and would limit the number of bits that can be stored in them. For example, if 18-bit memory blocks are used, two memory blocks will be needed to store a 20-bit multiplication result. In other words, more than one memory block will be needed to store results that are wider than the data width of the memory blocks used. Consequently, high-end filter applications with increasingly complex multiplications will require more and more memory blocks.

Therefore, it is desirable to have a technique to implement soft multipliers with fewer memory blocks. It is within this context that the invention arises.

SUMMARY

Embodiments of the present invention include techniques for implementing multipliers in an integrated circuit (IC).

It should be appreciated that the present invention can be implemented in numerous ways, such as a process an apparatus, a system, a device or a method on a computer readable medium. Several inventive embodiments of the present invention are described below.

In one embodiment, a method for implementing multipliers in an IC design is disclosed. The method includes generating a plurality of folded products. In one embodiment, the multipliers are used in a channel filter application and the products are generated by multiplying a plurality of data elements with a plurality of coefficients. The plurality of generated folded products is normalized to generate a plurality of normalized folded products. In an exemplary embodiment, the least significant bits (LSBs) of at least one of the normalized folded products are zeros. The plurality of normalized products is then scaled to reduce the root mean square (RMS) error of each of the plurality of normalized products. The scaled products with the least RMS error are then stored in a plurality of memory blocks in the IC.

In another embodiment a machine-readable storage medium is provided. The machine-readable storage medium is encoded with sequences of instructions that cause the machine to multiply a plurality of filter coefficients with a plurality of data elements to generate a plurality of products. The plurality of products is then normalized before being scaled. The plurality of scaled products is then examined and a scaled product with the least RMS error for each of the plurality of products is identified. In one embodiment, scaled products with the least RMS error are stored in memory blocks, e.g., embedded memory blocks in an IC.

In yet another embodiment, a method of implementing multipliers in a plurality of memory blocks for an IC design is disclosed. The method includes receiving a plurality of first and second operands and multiplying the plurality of operands with one another to generate a plurality of products. The plurality of products is normalized before being scaled to generate a plurality of scaled products. In one embodiment, different scaling factors are used to scale each of the plurality of products. A scaling factor with the least RMS error is then selected. The plurality of scaled products with the least RMS error is stored in a plurality of memory blocks.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which.

DETAILED DESCRIPTION

The following embodiments describe techniques for implementing multipliers in an integrated circuit (IC).

It will be obvious, however, to one skilled in the art, that the present invention may be practiced without some or all of these specific details. In other instances, well-known operations have not been described in detail in order not to unnecessarily obscure the present invention.

The embodiments described herein provide techniques to implement multipliers with memory blocks in an IC. The disclosed embodiments provide a more cost-effective method to implement multipliers using memory blocks in ICs. Some of the embodiments disclosed reduce the number of memory blocks needed to perform required multiplication operations.

Typically, embedded memory blocks are used to store multiplication results. These memory blocks may have a specific number of bits. If a particular multiplication result exceeds the number of bits supported by the memory blocks, more than one memory block has to be used in order to store the full multiplication result. The following embodiments provide methods to optimize the architecture of the multiplication application in order to reduce the number of memory blocks needed. Some of the embodiments describe methods to implement soft multipliers for downstream data processing of a cable head-end or filter applications using memory blocks with a smaller bit-width than the requirements of the filter applications. It should be appreciated that filter applications described herein may refer to various types of channel filters and other similar filters that require multiplication operations.

Figure 1A:
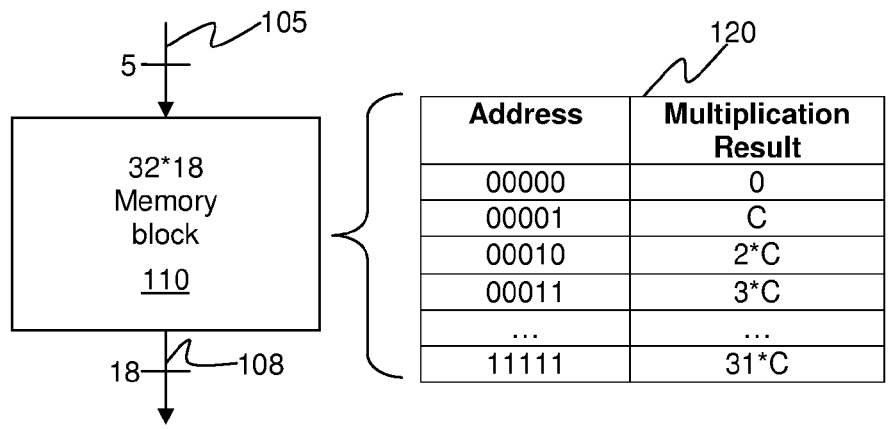
FIG. 1A, meant to be illustrative and not limiting, shows a memory block used as a multiplier.

FIG. 1A, meant to be illustrative and not limiting, shows memory block 110 used as a multiplier. The embodiment of FIG. 1A shows a soft multiplier implemented with a 32×18 memory block 110. In one embodiment, memory block 110 is a random access memory (RAM) block. Memory block 110 shows a 5-bit wide data input driving the address bus of memory block 110. Multiplier table 120 is a look-up table (LUT). Each address holds an 18-bit wide multiplication result for each input data. Since output bus 108 is 18 bits wide, more than one memory block will have to be used if the multiplication result is more than 18 bits. It should be appreciated that in the embodiment of FIG. 1A, a 5-bit wide address bus can accommodate 32 (2^5) addresses. Multiplier table 120 covers all the multiple combinations of the 5-bit of input data 105 with a 13-bit wide coefficient, C. One skilled in the art should appreciate that different multiplier configurations can be generated by memory block 110 by using LUTs with different coefficients.

Figure 1B:
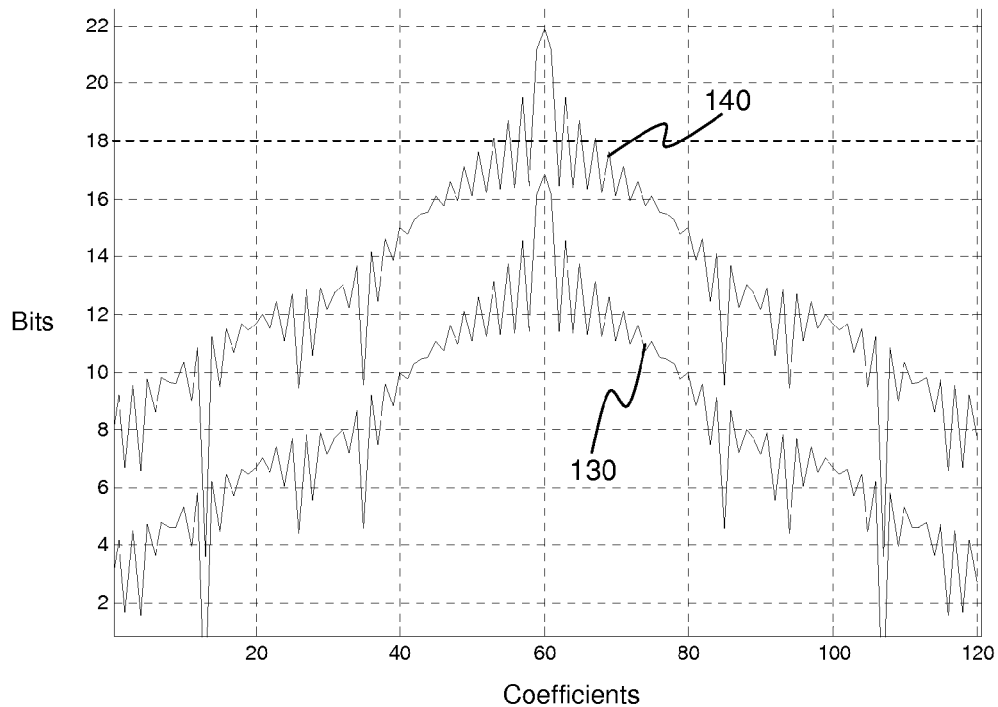
FIG. 1B, meant to be illustrative and not limiting, shows the distribution of the required significant bits for a plurality of coefficients and the distribution of the number of bits required for each corresponding product.

FIG. 1B, meant to be illustrative and not limiting, shows the distribution of the required bits for a plurality of coefficients 130 and the distribution of the number of bits required for each corresponding product 140. It should be appreciated that even though an odd number of coefficients is shown in the embodiment of FIG. 1B, the same technique can be applied to applications with an even number of coefficients. It should be appreciated that in the embodiment of FIG. 1B, coefficient 1 is similar to coefficient 121, coefficient 2 is similar to coefficient 120, coefficient 3 is similar to coefficient 119, and so on. In other words, data1*coefficient1 is similar to data121*coefficient121. Therefore, waveforms 130 and 140 can be "folded" along the Y-axis of coefficient 60. In the embodiment of FIG. 1B, coefficient 60, i.e., the center coefficient, requires the most number of bits. The resulting product of coefficient 60 consequently requires the most number of bits. However, the products for a majority of the coefficients can be represented with 18-bits or less. As such, an 18-bit wide memory block, e.g. memory block 110 of FIG. 1A, can be used to store the products for each of these coefficients. For next-to-center coefficients, i.e., coefficients 53-59, in this embodiment, that require more than 18 bits, at least two 18-bit wide memory blocks will be needed to store the products of these coefficients.

Table 1 below shows the number of significant bits required for folded products associated with coefficients 53, 55, 57 and 59, and the number of bits lost in terms of accuracy if the products were truncated to fit in 18-bit wide memory blocks.

TABLE 1

| Coefficient | Required bits | Worst case error in bits (relative to the LSB) |
| --- | --- | --- |
| 59 | 22 | 4 |
| 57 | 20 | 2 |
| 55 | 20 | 2 |
| 53 | 19 | 1 |
| others | <=18 | 0.5 |

As one skilled in the art will appreciate, the least significant bits (LSBs) can be truncated to make the products fit into a certain number of bits. If only one block of 18-bit wide memory block is used, products with more than 18 bits will have to be truncated in order to fit into an 18-bit wide memory block. However, a substantial amount of accuracy may be lost if the LSBs were simply truncated in order to reduce the number of bits required. If the number of bits can be reduced without losing a substantial amount of accuracy, fewer memory blocks will be needed to store all the products. One skilled in the art will appreciate that any coefficient may be selected to have its significant bits reduced in this context. In one embodiment, only folded products with more than 18 bits, or folded products that are normally associated with the next-to-center coefficients, have their significant bits reduced.

Figure 2:
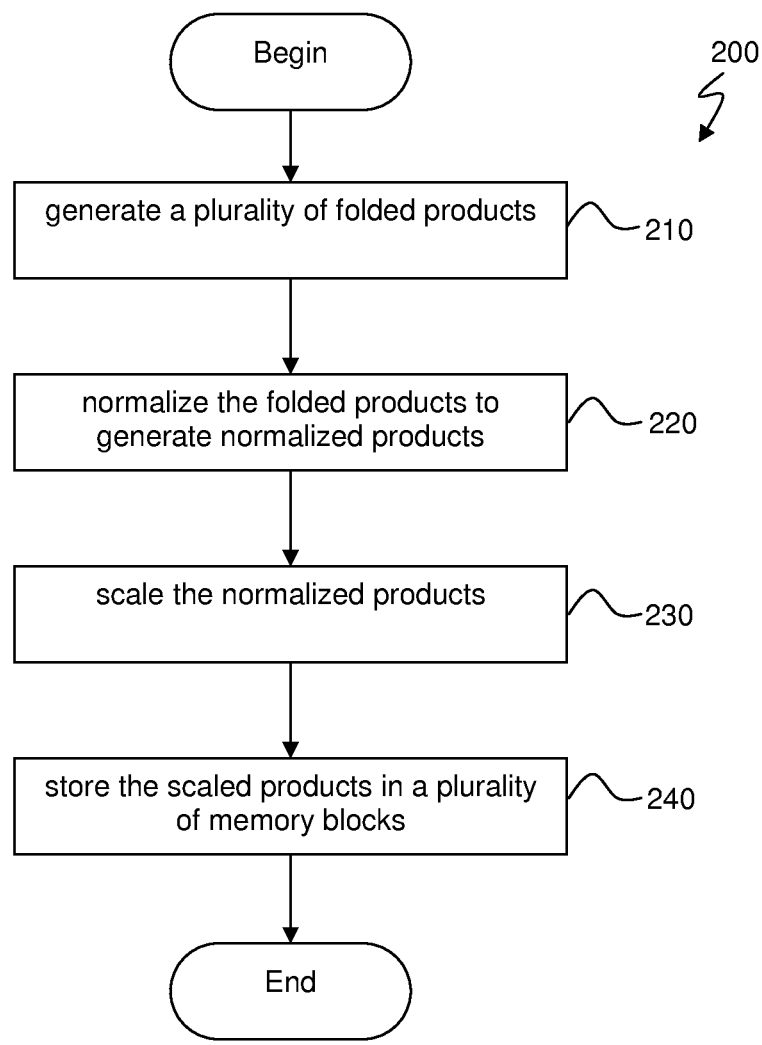
FIG. 2, meant to be illustrative and not limiting, shows a simplified method flow as one embodiment in accordance with the present invention.

FIG. 2, meant to be illustrative and not limiting, shows simplified method flow 200 as one embodiment in accordance with the present invention. Flow 200 starts with a plurality of folded products being generated in operation 210. In one embodiment, each of the folded products is a result of a multiplication between a data operand and a coefficient operand. One skilled in the art should appreciate that the data operand depends on the particular application and may be any number of bits wide while the coefficient operand depends on the signal to noise ratio (SNR) and the desired accumulated errors. In an exemplary embodiment, flow 200 represents the multiplication operation in a channel filter. As one skilled in the art should know, a channel filter may be even or odd symmetric. For example, in an odd symmetric channel filter with 121 coefficients, data1*coefficient1+ data121*coefficient121 is equivalent to coefficient1*(data1+ data121) as coefficient1 and coefficient121 are similar in a channel filter. For the sake of brevity, (data1+data121) as used in the example above will be referred to as a folded-sum and the result of folded-sum*coefficient is referred to as a folded product. Therefore, in one embodiment, if the folded sum has 5 significant bits, then there will be 32(2^5) folded products for each coefficient. The folded products for all coefficients, generated in operation 210, are normalized in operation 220. In one embodiment, the folded products are normalized such that the last four bits of all of the folded products associated with the next-to-center coefficient are all zeroes.

Referring still to FIG. 2, the normalized products are scaled in operation 230. In one embodiment, the scaling factors are chosen such that the last few bits of the folded products of the next-to-center coefficient are all zeroes. In an exemplary embodiment, scaling operation 230 searches for a minimum root mean square (RMS) error for the folded sum of each of the coefficient values. Scaling operation 230 searches and selects a scaling factor that produces the lowest aggregated RMS error. The scaled folded products are stored in a plurality of memory blocks in operation 240. In one embodiment, only the products that exceed the total number of bits supported by the plurality of memory blocks used are scaled in operation 230.

For example, in one embodiment, in an odd symmetric channel filter with 121 coefficients, the products of the center coefficient, i.e., coefficient 60, are stored in a 36-bit single ported memory. As such, the products associated with the center coefficient do not need to be optimized or scaled, in one embodiment. Consequently, according to one embodiment, only the products of the next-to-center coefficients are normalized and scaled in operations 220 and 230, respectively, to reduce the number of bits without substantially sacrificing the accuracy of these products. In an exemplary embodiment, a plurality of dual-ported memory blocks is used to store the folded products in operation 240. Some of the plurality of dual-ported memory blocks may be configured to operate in single-ported mode in order to store products with wider bit width. For instance, an 18-bit wide dual-ported memory block will have a total of 36-bits when operating as a single-ported memory block.

Figure 3:
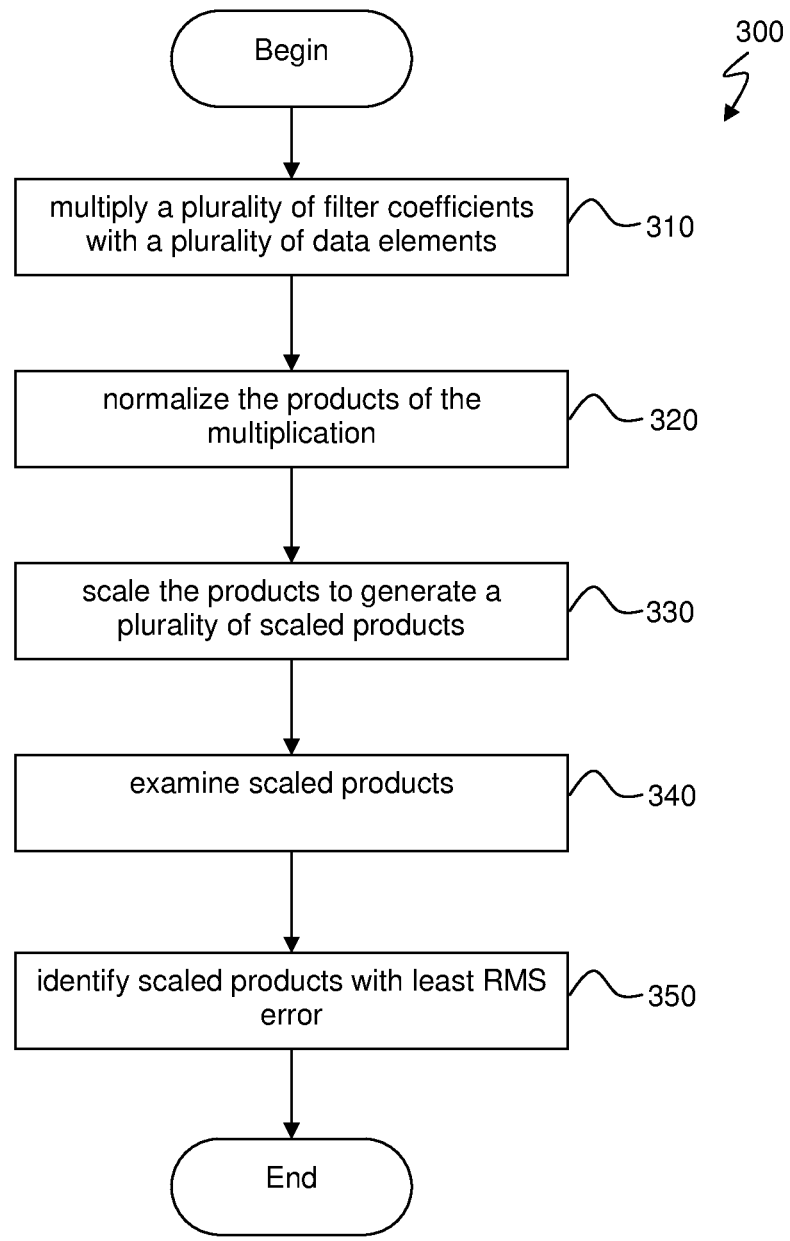
FIG. 3, meant to be illustrative and not limiting, shows a method flow as another embodiment in accordance with the present invention.

FIG. 3, meant to be illustrative and not limiting, shows method flow 300 as another embodiment in accordance with the present invention. A plurality of filter coefficients is multiplied with a plurality of data elements in operation 310 to generate a plurality of products. The resulting products are normalized in operation 320. The products are scaled in operation 330. In one embodiment, the scaling in operation 330 reduces the total number of bits of some of the products. The scaled products are examined in operation 340. In one embodiment, a search is performed in operation 340 to find a scaling factor with the least RMS error. According to one embodiment, the scaling factor with the least RMS error is a scaling factor that produces products that are relatively close to whole integers. The scaled products with the least RMS error are identified in operation 350. The scaled products with the least RMS are stored in memory blocks that can accommodate the scaled products. For example, the memory blocks may be embedded memory blocks in an IC that have been configured to store the scaled products. Configuration of such memory blocks can be performed using a design software that configures different blocks of the IC. In an exemplary embodiment, the design software initializes memory blocks in the IC by initializing a text-based file, e.g., a text file that stores the hexadecimal addresses and contents of the memory blocks. In one embodiment, the folded product output is shifted a certain number of bits, e.g., 4 bits, to the left during compilation before the output is summed with other folded products.

Figure 4:
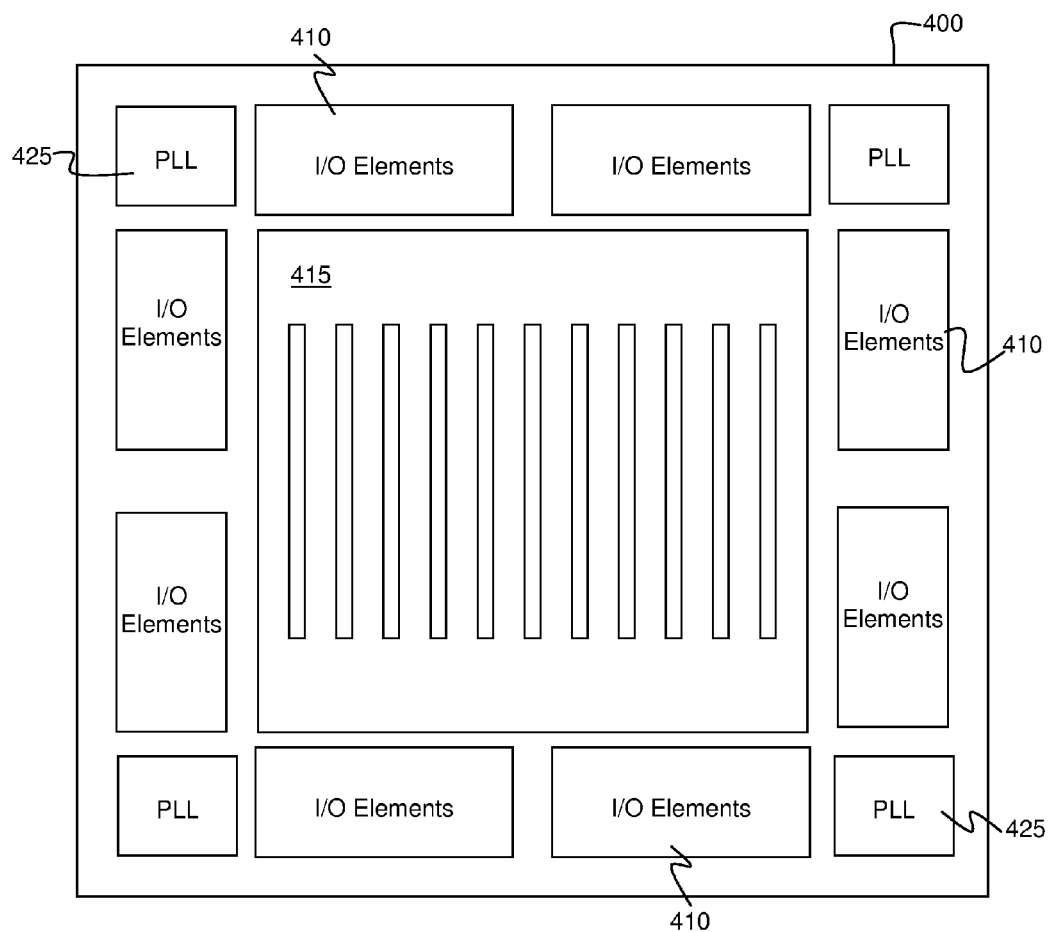
FIG. 4, meant to be illustrative and not limiting, shows a simplified block diagram of a PLD that can include aspects of the present invention.

FIG. 4, meant to be illustrative and not limiting, shows a simplified block diagram of PLD 400 that can include aspects of the present invention. Programmable device 400 includes logic region 415 and I/O elements 410. I/O elements 410 may support a variety of memory interfaces. Other auxiliary circuits such as phase-locked loops (PLLs) 425 for clock generation and timing, can be located outside the core logic region 415, e.g., at corners of programmable device 400 and adjacent to I/O elements 410. Logic region 415 may be populated with logic cells which include, among other things, at the most basic level, "logic elements" (LEs). LEs may include look-up table-based logic regions and these logic elements may be grouped into "Logic Array Blocks" (LABs). The logic elements and groups of logic elements or LABs can be configured to perform logical functions desired by the user. Logic region 415 may also include a plurality of embedded memory blocks that can be configured as soft multipliers in accordance with the embodiments of FIGS. 1, 2 and 3 to implement a root raised cosine (RRC) filter. In one embodiment, logic region 415 includes a plurality of embedded 32×18 memory blocks. It should be appreciated that the embedded memory blocks may be single-ported or dual-ported memory blocks. At least some of these embedded RAM blocks are used as multipliers as described in FIG. 1A.

Figure 5:
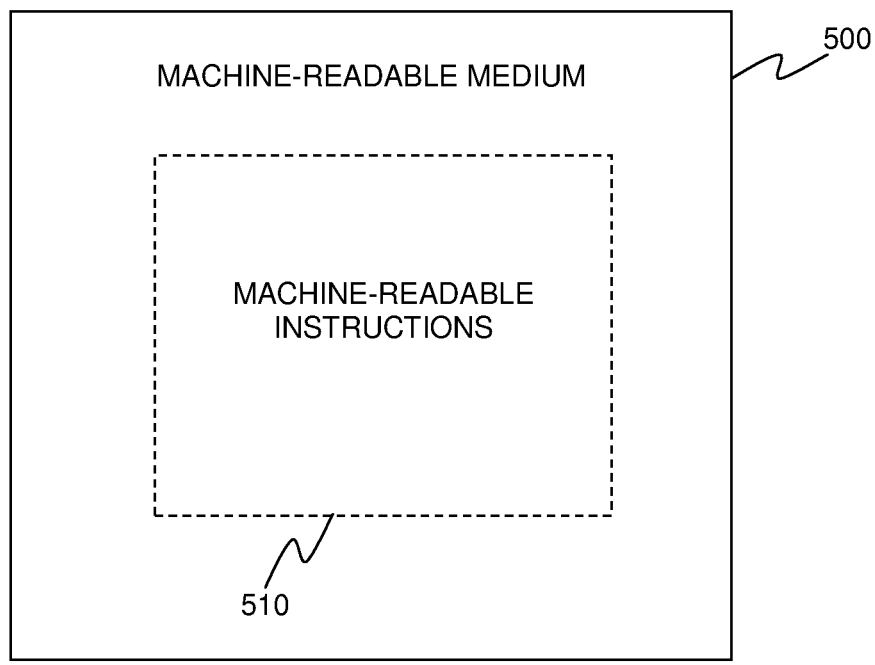
FIG. 5 is a simplified block diagram showing a machine-readable medium encoded with machine-readable instructions as an embodiment in accordance with the present invention.

The invention can also be embodied as machine-readable instructions 510 on machine-readable storage medium 500 as shown in FIG. 5. Machine-readable storage medium 500 is any data storage device that can store data, which can thereafter be read by a machine or a computer system. Illustrative examples of machine-readable storage medium 500 include solid state drives, hard drives, network attached storage (NAS), read-only memory, random-access memory, CDs, DVDs, USB drives, volatile and non-volatile memory, and other optical and non-optical data storage devices. Machine-readable storage medium 500 can also be distributed over a network-coupled computer system so that machine-readable instructions 510 are stored and executed in a distributed fashion. Machine-readable instructions 510 can perform any or all of the operations illustrated in FIGS. 2 and 3.

Figure 6:
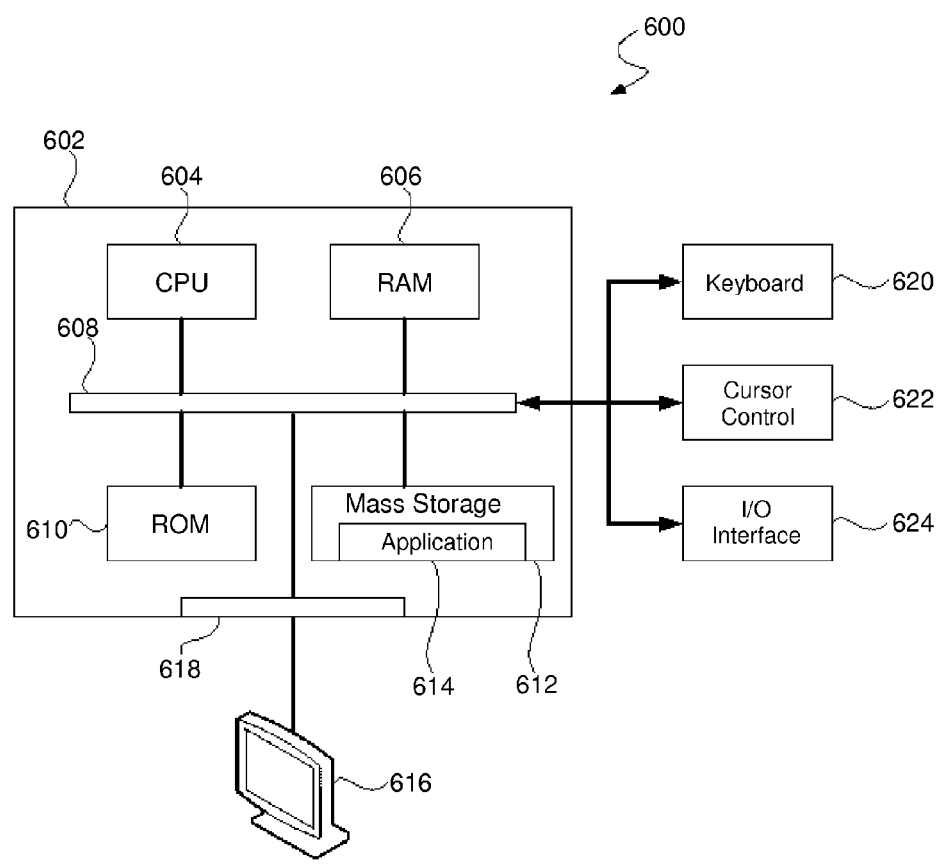
FIG. 6 is a simplified schematic diagram of a computer system for implementing embodiments of the present invention.

FIG. 6 is a simplified schematic diagram of a computer system 600 for implementing embodiments of the present invention. It should be appreciated that the methods described herein may be performed with a digital processing system, such as a conventional, general-purpose computer system. Special-purpose computers, which are designed or programmed to perform one function may be used in the alternative. In addition, the computer system of FIG. 6 may be used for the purpose of IC configuration and compilation. The computer system includes a central processing unit (CPU) 604, which is coupled through bus 608 to random access memory (RAM) 606, read-only memory (ROM) 610, and mass storage 612. Mass storage device 612 represents a persistent data storage device such as a floppy disc drive or a fixed disc drive, which may be local or remote. Application 614 resides in mass storage 612, but can also reside in RAM 606 during processing. According to one embodiment, design software 614 is used to configure IC devices that may include aspects of the present invention. For example, design software 614 may be used to generate a netlist for an IC device based on an IC design that includes any or all of the operations illustrated in FIGS. 2 and 3. According to another embodiment, application 614 is a computer application software that includes machine-readable instructions for carryout the methods as illustrated in the embodiments of FIGS. 2 and 3. It should be appreciated that CPU 604 may be embodied in a general-purpose processor, a special-purpose processor, or a specially programmed logic device.

Referring still to FIG. 6, display 616 is in communication with CPU 604, RAM 606, ROM 610, and mass storage device 612, through bus 608 and display interface 618. Keyboard 620, cursor control 622, and interface 624 are coupled to bus 608 to communicate information in command selections to CPU 604. For example, according to one embodiment, normalization and scaling input can be received as a command received by an input device (such as a mouse or keyboard). This user input is then communicated to CPU 604. It should be appreciated that data to and from external devices may be communicated through interface 624.

The embodiments, thus far, were described with respect to integrated circuits. The method and apparatus described herein may be incorporated into any suitable circuit. For example, the method and apparatus may be incorporated into numerous types of devices such as microprocessors or programmable logic devices. Exemplary programmable logic devices include programmable array logic (PAL), programmable logic array (PLA), field programmable logic arrays (FPLAs), electrically programmable logic devices (EPLDs), electrically erasable programmable logic devices (EEPLDs), logic cell arrays (LCAs), field programmable gate arrays (FPGAs), application specific standard products (ASSPs), application specific integrated circuits (ASICs), just to name a few.

The programmable logic device described herein may be part of a data processing system that includes one or more of the following components; a processor; memory; I/O circuitry; and peripheral devices. The data processing system can be used in a wide variety of applications, such as computer networking, data networking, instrumentation, video processing, digital signal processing, or any suitable other application where the advantage of using programmable or re-programmable logic is desirable. The programmable logic device can be used to perform a variety of different logic functions. For example, the programmable logic device can be configured as a processor or controller that works in cooperation with a system processor. The programmable logic device may also be used as an arbiter for arbitrating access to a shared resource in the data processing system. In yet another example, the programmable logic device can be configured as an interface between a processor and one of the other components in the system. In one embodiment, the programmable logic device may be one of the family of devices owned by the assignee.

Although the method operations were described in a specific order, it should be understood that other operations may be performed in between described operations, described operations may be adjusted so that they occur at slightly different times or described operations may be distributed in a system which allows the occurrence of the processing operations at various intervals associated with the processing, as long as the processing of the overlay operations are performed in a desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for implementing multipliers in an integrated circuit (IC) design, comprising:
   generating a plurality of folded products;
   normalizing the plurality of folded products to generate a plurality of normalized products;
   scaling at least a portion of the plurality of normalized products to generate a plurality of scaled folded products, wherein the scaling reduces a root mean square (RMS) error of the portion of the plurality of normalized products; and
   storing the plurality of scaled folded products in a plurality of memory blocks in the IC;
   wherein at least one method operation is performed through a processor.

2. The method of claim 1, wherein a plurality of least significant bits (LSBs) of the plurality of normalized products are zeroes, and wherein the stored scaled folded products are utilized in a channel filter application.

3. The method of claim 1, wherein the plurality of memory blocks is a plurality of dual-ported memory blocks.

4. The method of claim 3, further comprising:
   storing multiple scaled folded products in at least one of the dual-ported memory blocks.

5. The method of claim 1, wherein the IC design is implemented in a programmable logic device (PLD).

6. The method of claim 1, further comprising:
   shifting an output of one of the plurality of memory blocks;
   summing the shifted output with another output of one other memory block from the plurality of memory blocks.

7. The method of claim 1, further comprising:
   examining a plurality of scaling factors to determine a scaling factor that produces a least RMS error for the portion of the plurality of scaled products; and
   selecting the scaled folded products associated with the scaling factor having the least RMS error for the storing.

8. A non-transient machine-readable storage medium encoded with sequences of instructions for processing data, the sequences of instructions which when executed, cause the machine to perform:
   multiplying a plurality of filter coefficients with a plurality of data elements to generate a plurality of products, wherein each of the plurality of filter coefficients is multiplied with a corresponding data element;
   normalizing the plurality of products;
   scaling the plurality of products associated with the plurality of filter coefficients;
   examining each of the plurality of products; and
   identifying a plurality of scaled products with a least root mean square (RMS) error.

9. The machine-readable storage medium of claim 8, further comprising:
   storing the plurality of scaled products in the plurality of memory blocks, wherein some of the plurality of memory blocks are configured to store at least two scaled products each.

10. The machine-readable storage medium of claim 9, further comprising:
    designating the plurality of memory blocks to be operated as one of a dual-ported memory block or a single-ported memory block.

11. The machine-readable storage medium of claim 9, further comprising:
    shifting an output of the plurality of memory blocks by a number of bits; and
    summing the shifted output with another output from the plurality of memory blocks.

12. The machine-readable storage medium of claim 11, wherein the shifting is performed during compilation of the IC.

13. The machine-readable storage medium of claim 8, wherein the scaling the plurality of products includes scaling only a portion of the plurality of products, wherein at least one product with a maximum number of bits is not scaled.

14. The machine-readable storage medium of claim 8, wherein the scaling reduces a total number of bits for each of the plurality of products.

15. A method of implementing multipliers in a plurality of memory blocks for an integrated circuit (IC) design, comprising:
    receiving a plurality of first and second operands;
    multiplying the first and second operands for each operand pair to generate a plurality of products;
    normalizing the plurality of products;
    scaling at least a portion of the normalized plurality of products to generate a plurality of scaled products for each of the portion of the normalized plurality of products;
    selecting a scaling factor with a least root mean square (RMS) error for each of the plurality of scaled products; and storing the plurality of scaled products with the least RMS error in a plurality of memory blocks;

wherein at least one method operation is performed through a processor.

16. The method of claim 15, wherein the scaling the at least a portion of the normalized plurality of products includes scaling only a plurality of next-to-center products, wherein a center product with a maximum number of bits is not scaled.

17. The method of claim 15, wherein the plurality of first operands is a plurality of data elements and wherein the plurality of second operands is a plurality of coefficient values.

18. The method of claim 15, further comprising:
storing multiple scaled folded products in at least one of the dual-ported memory blocks.

19. The method of claim 15, further comprising:
determining an RMS error value for each of the plurality of scaled products; and
searching the plurality of scaled products to determine a scaling factor for the least RMS error for each of the plurality of scaled products.

20. The method of claim 15, wherein the method is implemented in an integrated circuit (IC) with a root raised cosine (RRC) filter.

21. The method of claim 15, wherein the IC design is in a form of a netlist implemented in an IC device.

* * * * *